United States Patent [19]
Livnat et al.

[11] Patent Number: 4,722,605
[45] **Date of Patent: * Feb. 2, 1988**

[54] METHOD AND APPARATUS FOR OPTICALLY MEASURING DISTANCE BETWEEN TWO SURFACES

[75] Inventors: Aminadav Livnat, Arad; Oded Kafri, Beer-Sheva, both of Israel

[73] Assignee: The State of Israel, Atomic Energy Commission, Beer Sheva, Israel

[ * ] Notice: The portion of the term of this patent subsequent to Jul. 10, 2001 has been disclaimed.

[21] Appl. No.: 903,832

[22] Filed: Sep. 3, 1986

Related U.S. Application Data

[63] Continuation of Ser. No. 463,322, Feb. 2, 1983, abandoned.

[30] Foreign Application Priority Data

Jul. 23, 1982 [IL] Israel ........................................ 66382

[51] Int. Cl.[4] ............................................... G01B 11/14
[52] U.S. Cl. ..................................................... 356/374
[58] Field of Search ............... 356/374, 376, 371, 381, 356/289, 382; 250/237.6; 340/619

[56] References Cited

U.S. PATENT DOCUMENTS

| | | | |
|---|---|---|---|
| 2,375,356 | 5/1945 | Flint | 356/249 |
| 2,621,808 | 12/1952 | Blakeney | 340/619 |
| 3,930,732 | 1/1976 | Holly | 356/128 |

FOREIGN PATENT DOCUMENTS

| | | | |
|---|---|---|---|
| 6168056 | 4/1980 | Sweden | 356/376 |

OTHER PUBLICATIONS

Theocaris et al., Slope Measurement by Means of Moire Fringes, Journal of Scientific Instrumentation, 1965, vol. 42, #81, pp. 607–610.

Fry et al., Analyzing Rapid Surface Motions with Moire Fringes, Proceedings of the 12th International Congress on High Speed Photography, Aug., 1976, SPIE, vol. 97, High Speed Photography, pp. 30–36.

Kafri et al. "Reflective Surface Analysis Using Moire Deflectometry" Applied Optics, pp. 3098–3099, vol. 20, No. 18, Sep. 15, 1981.

"Moire Technique for Measuring Liquid Level" Livnat et al., *Applied Optics*, vol. 21, #16, Aug. 15, 1982.

"Moire Fringe Multiplication Technique for Measuring Small Displacements" Shing Fong Su *Applied Optics*, vol. 22, #19, Oct. 1983.

*Primary Examiner*—R. A. Rosenberger
*Assistant Examiner*—Crystal D. Cooper
*Attorney, Agent, or Firm*—Browdy and Neimark

[57] ABSTRACT

A Moire system for linear measurement of an unknown distance defined by two surfaces, a collimated light source, a first grating between light source and the surfaces, a second grating positioned to receive collimated light from the surfaces after the light has reached the surfaces from the first grating, the first and second gratings being rotated relative to each other by a small angle $\theta$, a screen located after the second grating for receiving Moire patterns caused by the first and second gratings, and a mechanism for shifting the patterns as a function of the unknown distance whereby measurements of the amount of shifting is determinative of the unknown distance.

13 Claims, 6 Drawing Figures

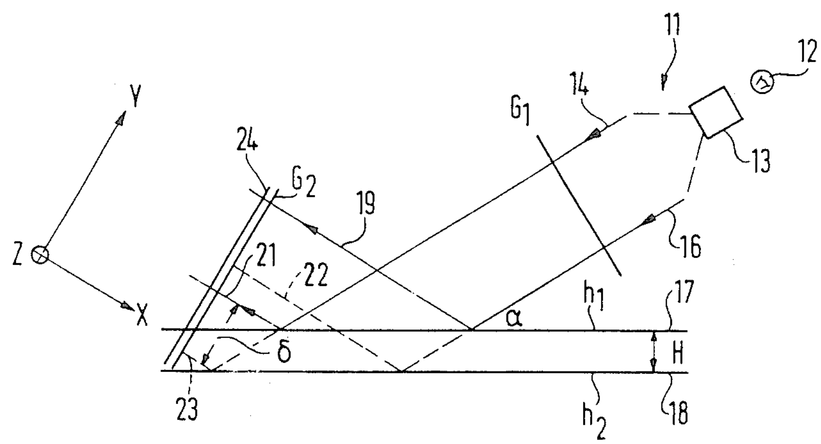
Fig. 1
Fig. 2
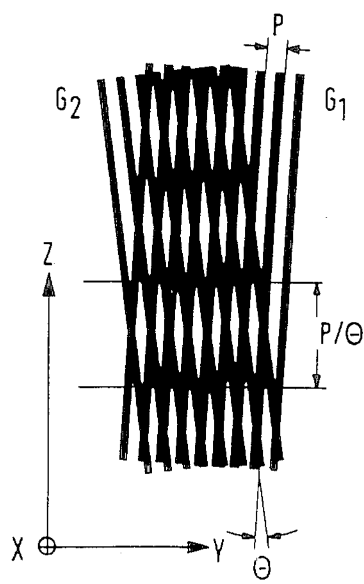

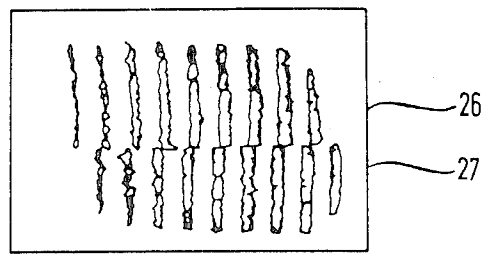
Fig. 3
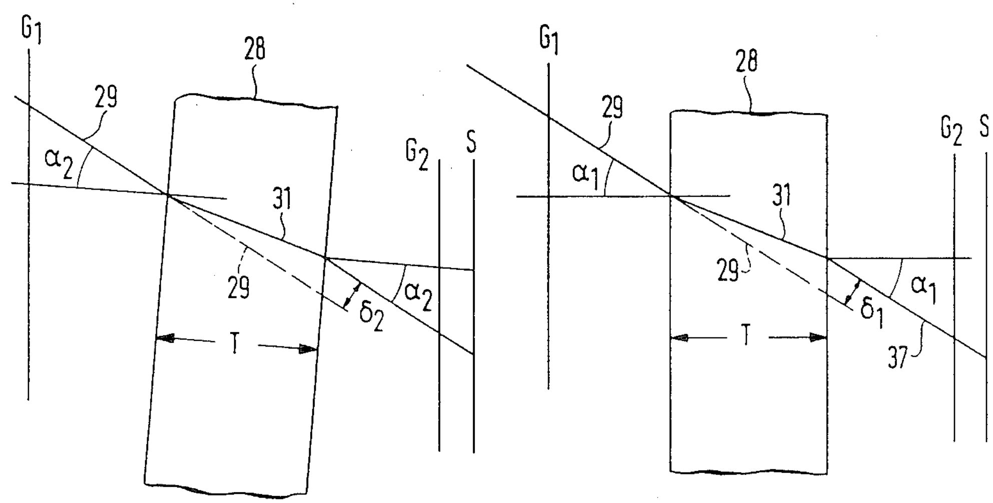
Fig. 4b
Fig. 4a
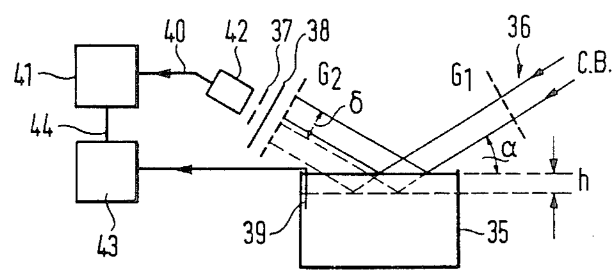
Fig. 5

METHOD AND APPARATUS FOR OPTICALLY MEASURING DISTANCE BETWEEN TWO SURFACES

This application is a continuation of application Ser. No. 463,322, filed Feb. 2, 1983, now abandoned.

This invention is concerned with methods and apparatus for optically measuring linear distances especially distance between two surfaces, and more particularly with using Moire fringe patterns for such linear measurements.

In many industrial and scientific processes there is a need to accurately and precisely measure difference in linear distances. In certain industrial processes it is often necessary to know the change in the level of liquids. For example, the crystal growing process in which the pooling of the crystal is controlled by the level of the liquid phase requires accurate and rapid determinations of changes in the liquid level. Certain measurements, like the rate of change of a volume of water cooling in an open container can be determined by measuring the change in liquid level. Also difference in linear distances determines the thickness of phase refractive bodies such as lenses or even of plate windows.

In determining the precise thickness of windows, or determining the precise change in level of a liquid in a container using prior art equipment and/or methods, problems arise. For example, to make those linear measurements mechanically, raises an immediate problem. The mechanical measurements are usually done at a fixed point or at points in the liquids or on the plate glass. These points may not be truly representative of the dimensions. Also the measurements generate errors. For example, the liquid may be hot or corrosive and thus harmful to measuring instruments. In addition surface tension of the liquid and solid interface affects the liquid level. Other problems arise such as, for example, ripples may be present in the liquid and thus the measurements may not be average levels. Similarly when measuring the thickness of a solid the measurement may be made at a point where there is an air bubble for example, making the thickness different than the average thickness.

Optical methods are suitable for the purpose because they are non-invasive and thus there is no physical contact between the measuring system and the liquid or the solid. However, prior art optical methods are relatively costly; in general they require the use of coherent light. It is rather expensive to keep an interferometric system in an industrial plant mechanically stable within $\lambda/10$ which is the requirement for interferometry measurements. Further in the micrometer regime the surface of a liquid is seldom stable. Therefore a requirement for the optical measuring system to be practical is that it should not be local but should encompass a great part of the surface area of the liquid or glass being measured in order to overcome and not be troubled by small fluctuations due to air bubbles or accidental wavelets, for example.

To overcome these problems, among others, and to provide an optical measuring system using non-coherent light which encompasses a great part of the surface area of the liquid or solid being measured, are among the objects of the present invention.

Accordingly it is an object of the present invention to provide new and improved apparatus and methods for measuring difference in linear distances in which the above-referred to disadvantages are substantially reduced or overcome and in which the above-referred to object is accomplished.

According to the present invention a system for linear measurement is provided, said system comprising:

- a collimated light source,
- an unknown distance defined by two surfaces at the beginning and at the end of said unknown distance,
- a first grating means between said collimated light source and said surfaces,
- a second grating means positioned to receive said collimated light reflected from or diffracted by said surfaces after said light has reached said surfaces from said first grating,
- said first and second grating being rotated relative to each other by an angle $\theta$,
- screen means located after said second grating means for receiving thereon Moire fringe patterns, and
- means for measurement of shifting of said Moire patterns as a function whereby measurements of the amount of shifting are determinative of said unknown distance.

A feature of the invention provides methods for measuring the change in the level of a liquid surface by: obtaining a first Moire pattern with the level of the liquid surface at a first position and with the collimated light shining through a first grating and being reflected from said surface in said first position through a second grating to provide a first Moire pattern on the screen, obtaining a second Moire pattern on said screen using the same method but wherein the level of the liquid has changed.

A further feature of the invention provides for determining the thickness of glass or a phase object, for example, by placing the glass between two Ronchi gratings to obtain a first Moire pattern on said screen, and rotating the glass whose thickness is being measured or taking the glass out of the beam path, which changes the Moire pattern. When the index of refraction of the glass is known then the change in the Moire pattern is determinative of the thickness of the glass.

Alternatively, the same method as used for determining the thickness of the glass can be used to determine the index of refraction of the glass where the thickness of the glass is known but the index refraction is not known.

Similarly the method of measuring the change of level of liquid can be used to study the evaporation kinetics of cooling liquids. Thus the heat of vaporization can be calculated by determining the change in the Moire patterns caused by a change in the level of the liquid per rate of time and at given temperatures.

Generally speaking a method using Moire fringe patterns for linear measurements comprises the steps of: collimating light from a light source, transmitting said collimated light through a first grating onto a first surface means, using light reflected from said first surface means to shine through a second grating onto a screen to form a first Moire pattern, varying the position of said surface means of said unknown distance thereby forming a second Moire pattern that is different than said first Moire pattern, determining the difference between said first and second Moire patterns, and utilizing those differences to determine the unknown distance.

The operation and utilization of the present invention will become more fully apparent from the description of preferred embodiments taken in conjunction with the following drawings, in which:

FIG. 1 is a schematic showing of a first embodiment of the system for measuring changes in the height of liquids;

FIG. 2 shows an example Moire pattern obtained using the system of FIG. 1;

FIG. 3 is a showing of a Moire pattern produced by reflection from the surface of water in a defined bath, showing a change in the pattern caused by a change in the water level;

FIGS. 4*a* and 4*b* are schematic showings of the system used for measuring the thickness of a transparent plate or index of refraction of the plate; and FIG. 5 is a showing of a more sophisticated system for determining the change in liquid height.

In the schematic showing of FIG. 1, a distance measuring system 11 is shown comprising a source of light 12 providing light for collimating means 13. The beam of collimated light defined by the extremes of the beam 14 and 16 passes through a first grating, preferably a Ronchi grating shown as grating $G_1$. The light from the grating shines onto a liquid surface at a first level and a second level shown by lines 17 and 18, respectively. Line 17 is the higher level and line 18 is the lower level. The distance between level 17 and level 18 is shown as H. It is this distance which is measured by the system.

The collimated light that comes through grating $G_1$ is reflected by the surface of the liquid 17 and passes through a grating $G_2$. The reflected light from surface 17 is represented by lines 19 and 21. There is also shown reflected light from a lower surface 18 that is defined by lines 22 and 23.

The light going through grating $G_2$ shines onto the screen 24. The screen is shown in the YZ plane as are the gratings $G_1'$, $G_2$. The Moire pattern obtained on the screen 24 is shown in FIG. 2.

In FIG. 2 the grating $G_1$ and the grating $G_2$ are rotated by an angle $\theta$ to each other. The pitch of each of the gratings $G_1$ and $G_2$ is p. The Moire pattern has a grating of pitch $p/\theta$. It should be recognised that the gratings $G_1'$ shown in FIG. 2, are the images of the pattern $G_1$ that are reflected from the top surface of the liquid. Also while the gratings $G_1'$ and $G_2$ are shown overlapped it should be recognised that the degree of overlap changes as the liquid level moves. The change in height of the liquid causes a shift in the Moire fringe pattern formed by the gratings $G_1'$ and $G_2$. This shift for example is shown in FIG. 3 where the top of the Figure shows a fringe pattern that is shifted from the pattern at the bottom of the Figure. The Moire fringe pattern 26 at the top is taken when the height of the liquid is $h_1$. The pattern 27 is when the height is lower, at $h_2$. The amount of the shift is a function of the change of height of the liquid.

The shift T of the Moire fringe patterns for small values of the angle $\theta$ is equal to or approximately equal to 2H cos $\alpha$ where $\alpha$ is the angle of incidence. The change of height H is equal to the shift of the Moire fringes or $(T\theta)/(2 \cos)$.

The sensitivity of the measurement is determined by resolution of the shift of the Moire fringe where the pitch of the final Moire fringe pattern is equal to p' which is equal to $p/\theta$. Then the sensitivity is determined by the fraction of p' that can be resolved or according to the equation.

$$\frac{p'}{F} = \frac{2H \min \cos \alpha}{\theta} .$$

Since p' is equal to $p/\theta$ the minimum detectable change in liquid level, $H \min = p/(2F \cos \alpha)$. Thus, for example in order to detect a level change of 10 micrometers gratings of a pitch of 5 lines per millimeter are required, i.e. F=10.

In Moire deflectometry the two gratings are both in the route of the reflected beam. In such configuration no change in Moire pattern will be observed due to change in liquid level. Only surface slopes will be observed. However, the arrangement described herein is also a deflectometer and when the surface is not stable a distorted pattern will appear on the screen S. The shift of the Moire fringe pattern at a local point by an amount h can be shown to be due to the derivative $\beta$ of the surface at that point, given by $$\beta = \frac{h\,\theta}{2\Delta} ;$$

where $\Delta$ is the distance traversed by the beam of collimated light between the two gratings. In Moire deflectometry the amplification factor is determined by the angle $\theta$ and the distance $\Delta$. In the method described herein $\Delta$ does not affect the sensitivity. The smallest derivative detectible in this system due to deflectometry is calculated as in the prior equation with H min.=p'/F. Thus $\beta$ min. is equal to $p/(2\Delta F)$. Noise caused by surface motion can therefore be reduced by reducing $\Delta$. A reading of the noise however may be advantageous because it is indicative of the flatness of the measured surface.

In FIG. 4*a* and 4*b* the method and apparatus are used for measuring the thickness T of a transparent plate such as a window plate. There are two unknown factors involved in this measurement, i.e. the thickness T and the index of refraction n, one of which has to be known. FIG. 4*a* shows the pattern obtained originally with the collimated light first going through the grating $G_1$ and then being deflected or refracted in the plate. FIG. 4*b* shows the plate rotated to vary the angle of incidence from $\alpha 1$ to $\alpha 2$. The collimated light is represented in FIG. 4*a* by line 29 which passes through grating $G_1$ and strikes the window 28 at an angle to the perpendicular $\alpha 1$. In the glass the light is refracted from line 29 to line 31. The light beam is thus deflected a distance $\delta$ upon leaving the glass from where the beam would have been if it was not refracted. The light beam 32 leaves the window at an angle $\alpha 1$ to the perpendicular to the window. The amount of deflection $\delta$ is a function of the thickness T and the index of refraction n of the window and angle of incidence $\alpha$. The light goes through the grating $G_2$ and onto the screen S where a Moire pattern is set up by the light going through both gratings $G_1$ and $G_2$.

In FIG. 4*b* the window is shown rotated so that the angle of incidence $\alpha 2$ is different from the angle of incidence $\alpha 1$. Therefore $\delta 2$ is also different than $\delta 1$ and there is a shift in the Moire fringe pattern on the screen S.

In FIG. 4*a* $\delta 1$ is the amount of the shift. Because of the change in $\delta$ the Moire pattern shifts similar to the shift shown in FIG. 3. It can be shown that $$\delta = T \cos \alpha \left[ 1 - \frac{\sin \alpha}{\sqrt{n^2 - \cos^2\alpha}} \right] ;$$

where T is the thickness of the window and n is the index of refraction. Thus if the index of refraction of the window is known then the thickness can be determined. If the thickness is known then the index of refraction can be determined.

In an actual measurement, two gratings $G_1$ and $G_2$ having a pitch p of $\frac{1}{8}$ mm were used. A plexiglass window of 8 mm thickness was placed in parallel to the gratings plane. Then the window was rotated until shift of one full fringe p' was observed. This occurred at an angle of 2.95°. Thus in the equation $\delta$ was equal to p. Then n was calculated to be $1.435 \pm 6 \times 10^{-3}$.

A more sophisticated version of the system described with regard to FIG. 1 was used to study the evaporation kinetics of a cooling liquid (water) in open air. The system enabled carefully measuring the decrease in the liquid level.

The apparatus used is schematically shown in FIG. 5. Therein a container of liquid 35 had collimated light shown at 36 directed at the surface of the liquid therein through a first Ronchi grating $G_1$. The light struck the surface of the liquid at an angle $\alpha$ and of course was reflected at the angle $\alpha$. The reflected light was directed through a second Ronchi grating $G_2$, a filter 38, a slit 37 to a photodiode 42. The output of the photodiode is conducted through conductor 40 to amplifier 41. The output of the amplifier is coupled to a recorder 43 through conductor 44.

The slit limits the passage of the Moire fringe pattern going to the photodiode to a single fringe. The filter 38, selected at 6328 Å suppresses background radiation arriving at the photodiode 36. The recording of the recorder provides amplitudes versus time readings of the outputs of the photodiode 36 and a thermocouple 39.

The gratings $G_1$ and $G_2$ are normal to the direction of propagation of the light beams, $G_1$ being normal to the direction of propagation of the incidence beam while $G_2$ is normal to the reflected beam. Here as in the system of FIG. 1 the sensitivity of the visual measurement is limited by the optical resolution. The intensity of the reflected light from the surface of the liquid was improved through the use of a mirror on a float. The thermocouple 39 preferably of chromelalumel is immersed in the liquid to provide instantaneous temperature readings to the recorder 43.

In a preferred embodiment the optical set-up consisted of a collimated light source comprising a beam of 5 milliwatt HeNe laser expanded by a collimator such as a telescope. The Ronchi gratings $G_1$ and $G_2$ of 0.25 mm pitch and an opening ratio of 0.5. The angle $\theta$ was kept small. The incidence angle $\alpha$ was 21°. The fringe shift was monitored by a photodiode 36 whose aperture was limited as described by slit 37 to cover a single fringe.

The system and methods described herein can be used for experimental purposes, laboratory measurements as well as for industrial purposes. New and relatively inexpensive systems and methods for measuring liquid levels and the thickness of refractive objects have been described. The systems and methods do not require the extreme care and precision equipment heretofore required when using interferometry for making similar measurements. In addition coherent light is not required. Therefore new and remarkable systems and methods have been described.

While the principles of the invention have been described above in connection with specific apparatus and applications, it is to be understood that this description is made by way of example only and not as a limitation on the scope of the invention.

We claim:

1. A Moire system for linear measurement comprising:

an unknown distance defined by two surfaces,
a collimated light source,
a first grating between light source and first surface,
a second grating positioned to receive said collimated light from said first surface,
said first and second gratings, being rotated relative to each other by a small angle $\theta$,
screen means located after said second grating for directly receiving, without passage through lenses, on said screen means of Moire patterns caused by said first and second gratings, and
means for illuminating the second surface and obtaining a second shifted Moire pattern whereby measurements of the amount of said shift is determinative of said unknown distance.

2. A method for measuring an unknown linear distance utilizing Moire patterns, said method comprising
collimating light from a light source,
directing light reflected or diffracted from said surface through a second grating oriented at an angle relative to said first grating without passage through a lens to produce a Moire pattern,
directing said collimated light without passage through a lens to a second surface spaced from said first surface by the unknown linear distance and obtaining a second, shifted, Moire pattern,
measuring the amount of shift from the first to the second Moire pattern, and
using the measured amount of shift for determining the unknown distance between the two surfaces.

3. The Moire system of claim 1 wherein said surfaces comprise a first liquid surface and a second liquid surface, said first and second liquid surfaces being of the same liquid in a container.

4. The Moire system of claim 1 wherein said first and second gratings are Ronchi gratings.

5. The Moire system of claim 1, wherein means are provided for determining when the Moire patterns have shifted by one fringe.

6. The Moire system of claim 5 wherein said means for determining a one fringe shift comprises slit means, and light responsive means for determining changes in light passing through said slit.

7. The Moire system of claim 1 wherein said surfaces comprise the surfaces defining the thickness of a plate window.

8. The Moire system of claim 7 wherein said means for obtaining a second shifted Moire pattern comprises means for rotating said plate window to change the angle of incidence of collimated light on said plate window.

9. A method according to claim 2 wherein said first surface is a first level of a liquid and said second surface is a changed level of said liquid, whereby said method for measuring an unknown linear distance comprises the method of determining changes in the level of the liquid.

10. The method of claim 9 including floating a mirror on said liquid to increase the reflected light intensity.

11. A method according to claim 9 including the step of reflecting the light from the first surface of the liquid and changing the level of the liquid to the second surface to shift the pattern.

12. A method according to claim 2 wherein said surfaces comprise the surface defining the thickness of a plate window, and said second, shifted, Moire pattern is obtained by rotating said plate window to change the angle of incidence of collimated light refracted therethrough.

13. An apparatus for determining the unknown thickness of a transparent element having two opposite, generally parallel planar surfaces, comprising a collimated light source, a first grating between said collimated light source and a first surface of the element to be measured, a second grating positioned to receive collimated light refracted through the transparent element to be measured and coming from the second surface thereof, said first and second gratings being rotated relative to each other by a small angle $\theta$, screen means located after said first grating for receiving thereon Moire patterns caused by said first and second gratings, and means for shifting said patterns as a function of the thickness of the transparent element by rotating the transparent element to change the angle of incidence of collimated light passing therethrough, whereby measurements of the amount of said shifting is determinative of said unknown thickness.

* * * * *